Patented Aug. 24, 1954

2,687,436

UNITED STATES PATENT OFFICE 2,687,436

SUBSTITUTED 3-(2-NAPHTHYL)-CYCLOHEXANE

Frederick C. Novello, Lansdale, Pa., assignor to Merck & Co., Inc., a corporation of New Jersey No Drawing. Application January 28, 1952,
Serial No. 268,693

6 Claims. (Cl. 260—590)

This invention relates to novel chemical compounds, and in particular to novel 2,6-disubstituted naphthalene compounds which can be illustrated by the general formula

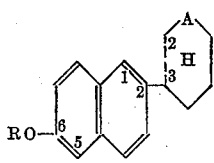

wherein either (a) there is no unsaturation between the 2- and 3-position carbon atoms of the cyclohexyl radical, or (b) there is a double bond linkage between the carbon atoms in the 2- and 3-positions; and wherein R is hydrogen or an alkyl group, preferably a low molecular weight alkyl group; and A is an aliphatic radical having the structure

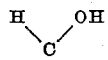

or a radical convertible thereto, such as the carbonyl radical having the structure

These compounds are useful as intermediates in the synthesis of steroid hormones. In addition, some of the new compounds have been found to have estrogenic activity, while others have been found to be useful in the treatment of collagen diseases.

The compounds of the invention are advantageously prepared from 2-(beta-dialkylaminopropionyl)-6-alkoxynaphthalene which is made from the readily obtainable 2-(lower aliphatic acyl)-6-alkoxynaphthalenes, an acid additions salt of a dialkylamine, and paraformaldehyde. Upon heating these intermediates, suitably under reflux, the acid addition salt of a 2-(beta-dialkylaminopropionyl)-6-alkoxynaphthalene is obtained, which, upon heating with an alkyl ester of acetoacetic acid, preferably a lower-alkyl ester of acetoacetic acid, such as the methyl- or ethyl-acetoacetate, advantageously in the presence of an alkali metal, as sodium or potassium, dissolved in a primary-, secondary-, or tertiary-alcohol, advantageously potassium dissolved in tertiary-butyl alcohol, or sodium hydroxide or potassium hydroxide in alcohol, is converted to 3-(6-alkoxy-2-naphthyl)-cyclohexen-2-one-1. This compound can then be converted into any of the other compounds embraced within the scope of the above general formula. Thus, by hydrogenation in the presence of palladium, one molar equivalent of hydrogen is absorbed and the compound is converted to the corresponding 3-(6-alkoxy-2-naphthyl)-cyclohexanone; or if the hydrogenation is conducted in the presence of platinum, two molecular equivalents of hydrogen can be introduced into the molecule converting it to the corresponding 3-(6-alkoxy-2-naphthyl)-cyclohexanol-1. Likewise, if the saturated carbonyl compound, obtained as the result of hydrogenation in the presence of palladium, is treated with an additional molecular equivalent of hydrogen in the presence of platinum, the same 3-(6-alkoxy-2-naphthyl)-cyclohexanol-1 is obtained. The 3-(6-alkoxy-2-naphthyl)-cyclohexen-2-one-1 can also be converted to 3-(6-alkoxy-2-naphthyl)-cyclohexen-2-ol-1 by heating it, suitably under a reflux condenser, and advantageously in the presence of an excess of an aluminum alkoxide, such as aluminum isopropoxide, while simultaneously removing by distillation the acetone formed during the reaction.

Similarly, the 3-(6-alkoxy-2-naphthyl)-cyclohexen-2-one-1 can be converted to the 6-hydroxy-2-naphthyl derivatives by heating the carbonyl compound, advantageously under reflux conditions in the presence of an inert solvent and a catalyst, such as an aluminum halide, preferably the chloride or bromide. The 3-(6-hydroxy-2-naphthyl)-cyclohexen-2-one-1 can be treated in the same manner as the product from which it was obtained to convert it to the corresponding 6-hydroxy-2-naphthyl derivatives, such as the 3-(6-hydroxy-2-naphthyl)-cyclohexanone by hydrogenation in the presence of palladium; the 3-(6-hydroxy-2-naphthyl)-cyclohexanol by hydrogenation in the presence of platinum; the 3-(6 - hydroxy - 2 - naphthyl) - cyclohexen - 2 - ol-1 by heating in the presence of an aluminum alkoxide. The 3-(6-hydroxy-2-naphthyl)-cyclohexen-2-one-1 can also be converted to the desirable 3-(6-hydroxy-5,6,7,8-tetrahydro-2-naphthyl)-cyclohexanol by hydrogenation at elevated temperatures and pressures in the presence of alcoholic alkali and a nickel catalyst; and the 3-(6-hydroxy-2-naphthyl)-cyclohexanone can be converted to 3-(6-hydroxy-2-naphthyl)-cyclohexanol by hydrogenation in the presence of platinum.

The preparation of the various compounds of this invention is explained in more detail by the following illustrative examples. It is to be understood, of course, that many modifications can be made in the reaction conditions, and it is not intended that the invention be limited to the explicit reaction conditions recited in the examples.

*Example 1.—3-(6-methoxy-2-naphthyl)-cyclohexen-2-one-1*

(a) A mixture of 37.5 grams of 2-acetyl-6-methoxynaphthalene, 16.3 grams of dimethylamine hydrochloride, 8.8 grams of paraformaldehyde in 100 ml. of ethanol and 5 drops of concentrated hydrochloric acid was refluxed for 48 hours and concentrated to dryness in vacuo. The residual solid was collected on the filter and washed with ether. Crystallization from alcohol gave 2-(beta-dimethylaminopropionyl)-6-methoxynaphthalene hydrochloride, M. P. 184–185.5° C.

(b) Sixty grams of the above obtained product was mixed with 25.2 grams of methyl acetoacetate and refluxed for 24 hours with a solution of 10.0 grams of potassium in 850 ml. of tertiary-butyl alcohol. The mixture was then cooled, acidified with dilute hydrochloric acid and filtered. The filtrate was concentrated in vacuo and the residue treated with 500 ml. of water and cooled in an ice bath. The solid was collected on the filter and dissolved in benzene. The benzene solution was then washed with two 100 ml. portions of water, two 100 ml. portions of 5% sodium hydroxide, two 100 ml. portions of water and then dried over sodium sulfate, filtered and evaporated to dryness. Crystallization from a mixture of acetone-petroleum ether yielded 3 - (6-methoxy-2-naphthyl)-cyclohexen-2-one-1, M. P. 142.3–143.3° C.

*Example 2.—3-(6-ethoxy-2-naphthyl)-cyclohexen-2-one-1.*—By replacing the 2-acetyl-6-methoxynaphthalene of Example 1 by an equimolecular quantity of 2-acetyl-6-ethoxynaphthalene and following substantially the same procedure described therein, there is obtained 3-(6-ethoxy-2-naphthyl)-cyclohexen-2-one-1.

*Example 3.—3-(6-propoxy-2-naphthyl)-cyclohexen-2-one-1.*—By replacing the 2-acetyl-6-methoxynaphthalene of Example 1 by an equimolecular quantity of 2-acetyl-6-propoxynaphthalene and following substantially the same procedure described therein, there is obtained 3-(6-propoxy-2-naphthyl)-cyclohexen-2-one-1.

*Example 4.—3-(6-butoxy-2-naphthyl)-cyclohexen-2-one-1.*—By replacing the 2-acetyl-6-methoxynaphthalene of Example 1 by an equimolecular quantity of 2-acetyl-6-butoxynaphthalene and following substantially the same procedure described therein, there is obtained 3-(6-butoxy-2-naphthyl)-cyclohexen-2-one-1.

*Example 5.—3-(6-pentoxy-2-naphthyl)-cyclohexen-2-one-1.*—By replacing the 2-acetyl-6-methoxynaphthalene of Example 1 by an equimolecular quantity of 2-acetyl-6-pentoxynaphthalene and following substantially the same procedure described therein, there is obtained 3-(6-pentoxy-2-naphthyl)-cyclohexen-2-one-1.

*Example 6.—3-(6-methoxy-2-naphthyl)-cyclohexanone.*—A solution of 5.0 grams of 3-(6-methoxy-2-naphthyl)-cyclohexen-2-one-1, obtained as in Exemple 1, in 50 ml. of dioxane was shaken with hydrogen at atmospheric pressure at 50–55° C. in the presence of 1 gram 5% palladium charcoal catalyst until one molar equivalent of hydrogen was absorbed. The solution was filtered, concentrated, and the product crystallized from alcohol yielding 3 - (6 - methoxy - 2 - naphthyl) - cyclohexanone, M. P. 124–125° C.

*Example 7.—3-(6-ethoxy-2-naphthyl)-cyclohexanone.*—By replacing the 3-(6-methoxy-2-naphthyl)-cyclohexen-2-one-1 of Example 6 by an equimolecular quantity of 3-(6-ethoxy-2-naphthyl)-cyclohexen-2-one-1, prepared as described in Example 2, and following substantially the same procedure described in Example 6, there is obtained 3-(6-ethoxy-2-naphthyl)-cyclohexanone.

*Example 8.—3-(6-butoxy-2-naphthyl)-cyclohexanone.*—By replacing the 3-(6-methoxy-2-naphthyl)-cyclohexen-2-one-1 of Example 6 by an equimolecular quantity of 3-(6-butoxy-2-naphthyl)-cyclohexen-2-one-1, prepared as described in Example 4, and following substantially the same procedure described in Example 6, there is obtained 3-(6-butoxy-2-naphthyl)-cyclohexanone.

*Example 9.—3-(6-methoxy-2-naphthyl)-cyclohexanol.*—A solution of 1 gram of 3-(6-methoxy-2-naphthyl)-cyclohexen-2-one-1, obtained as described in Example 1, in 50 ml. of ethanol was shaken with hydrogen at atmospheric pressure in the presence of 150 mg. of platinum catalyst until 2 molar equivalents of hydrogen were absorbed. The solution was filtered, concentrated, and the product crystallized from a mixture of alcohol-hexane, yielding 3-(6-methoxy-2-naphthyl)-cyclohexanol, M. P. 127.6–129.2° C.

*Example 10.—3-(6-ethoxy-2-naphthyl)-cyclohexanol.*—By replacing the 3-(6-methoxy-2-naphthyl)-cyclohexen-2-one-1 of Example 9 by an equimolecular quantity of 3-(6-ethoxy-2-naphthyl)-cyclohexen-2-one-1, prepared as described in Example 2, and following substantially the same procedure described in Example 9, there is obtained 3-(6-ethoxy-2-naphthyl)-cyclohexanol.

*Example 11.—3-(6-methoxy-2-naphthyl)-cyclohexanol.*—1 gram of 3-(6-methoxy-2-naphthyl)-cyclohexanone, obtained as described in Example 6, was dissolved in 50 ml. ethanol and shaken with hydrogen at room temperature and at atmospheric pressure in the presence of 100 milligrams of Adams' catalyst until a molar equivalent of hydrogen had been absorbed. The solution was then filtered to separate the catalyst, the filtrate concentrated and the 3-(6-methoxy-2-naphthyl)-cyclohexanol crystallized from a mixture of alcohol-hexane, M. P. 127.6–129.2° C.

*Example 12.—3-(6-ethoxy-2-naphthyl)-cyclohexanol.*—By replacing the 3 - (6 - methoxy-2-naphthyl)-cyclohexanone of Example 11 by an equimolecular quantity of 3-(6-ethoxy-2-naphthyl)-cyclohexanone, prepared as described in Example 7, and following substantially the same procedure described in Example 11, there is obtained 3-(6-ethoxy-2-naphthyl)-cyclohexanol.

*Example 13.—3 - (6 - methoxy - 2 - naphthyl) - cyclohexen-2-ol-1.*—1.26 grams of 3-(6-methoxy-2-naphthyl)-cyclohexen-2-one-1, obtained by the process described in Example 1, was dissolved in a mixture of 20 ml. of dry benzene and 25 ml. isopropanol and refluxed with excess aluminum isopropoxide in such a manner that acetone, which is a product of the reaction, was distilled dropwise from the reaction mixture. When no more acetone came over, the reaction mixture was hydrolyzed with dilute sulfuric acid and the white precipitate was collected on a filter and washed with water. Crystallization from a mixture of alcohol-water yielded 3-(6-methoxy-2-naphthyl)-cyclohexen-2-ol-1.

*Example 14.—3-(6-butoxy-2-naphthyl)-cyclohexen-2-ol-1.*—By replacing the 3-(6-methoxy-2-naphthyl)-cyclohexen-2-one-1 of Example 13 by an equimolecular quantity of 3-(6-butoxy-2-naphthyl)-cyclohexen-2-one-1, prepared by the process described in Example 4, and following substantially the same procedure described in Example 13, there is obtained 3-(6-butoxy-2-naphthyl)-cyclohexen-2-ol-1.

*Example 15.—3 - (6 - hydroxy - 2 - naphthyl)-cyclohexen-2-one-1.*—A solution of 2.5 grams of 3 - (6-methoxy-2-naphthyl)-cyclohexen-2-one-1, prepared by the process described in Example 1, in 40 ml. xylene was refluxed for 15 minutes with 5 grams of aluminum chloride. The reaction mixture was then cooled and poured onto a mixture of 25 grams of ice and 10 ml. of concentrated hydrochloric acid. The solid precipitate was collected on a filter, dissolved in hot 10% aqueous sodium hydroxide, decolorized and acidified while hot with hydrochloric acid yielding 3-(6-hydroxy-2-naphthyl)cyclohexen-2-one-1, which, after recrystallization from a mixture of alcohol-hexane, melted at 215.1–217.4° C.

Any 3 - (6 - alkoxy-2-naphthyl)-cyclohexen-2-one-1, such as any of the compounds prepared by the process described in Examples 2 through 5 or their chemical equivalents, can be hydrolyzed in substantially the same manner outlined in Example 15 to produce 3-(6-hydroxy-2-naphthyl)-cyclohexen-2-one-1.

*Example 16.—3-(6-hydroxy - 2 - naphthyl)-cyclohexanone.*—A solution of 1 gram 3-(6-hydroxy-2-naphthyl)-cyclohexen-2-one-1, as prepared in Example 15, in 70 ml. of glacial acetic acid was shaken with hydrogen at atmospheric pressure in the presence of 150 mg. of palladium catalyst until one molar equivalent of hydrogen was absorbed. The solution was then filtered, concentrated to dryness in vacuo and the product purified by distillation at 0.5 mm. followed by crystallization from a mixture of benzene-hexane, yielding 3-(6-hydroxy-2-naphthyl)-cyclohexanone melting at 147–150° C.

*Example 17.—3-(6-hydroxy - 2 - naphthyl)-cyclohexanol.*—A solution of 1 gram of 3-(6-hydroxy-2-naphthyl)-cyclohexen - 2 - one-1, prepared by the process described in Example 15, in 100 ml. of ethanol was shaken with hydrogen at atmospheric pressure in the presence of 1 gram of nickel catalyst until hydrogen absorption ceased. The solution was filtered and concentrated in vacuo and the residue taken up in 150 ml. of ether. The ethereal solution was washed with water, then with 5% sodium bicarbonate solution and then dried over anhydrous sodium sulfate, filtered and evaporated to dryness. After crystallization from a mixture of alcohol-water, the product, 3-(6-hydroxy-2-naphthyl)-cyclohexanol melted at 217–218° C.

*Example 18.—3-(6-hydroxy - 2 - naphthyl)-cyclohexanol.*— One gram of 3-(6-hydroxy-2-naphthyl)-cyclohexanone, prepared as in Example 16, in 50 ml. ethanol was shaken with hydrogen at room temperature and at atmospheric pressure in the presence of 100 mgms. of platinum catalyst. After the theoretical quantity of hydrogen for the reduction of ketone to carbinol had been absorbed, the solution was filtered from the catalyst, concentrated and the product crystallized from a mixture of alcohol-water yielding 3-(6-hydroxy-2-naphthyl)-cyclohexanol, M. P. 217–218° C.

*Example 19.—3-(6-hydroxy - 2 - naphthyl)-cyclohexen-2-ol-1.*—A solution of 2.4 grams of 3-(6 - hydroxy - 2 - naphthyl) - cyclohexen-2-one-1, prepared as in Example 15, in 20 cc. of water containing 600 mgms. sodium hydroxide was shaken with 1.3 grams of acetic anhydride. The solid material thus formed was collected on a filter, washed with water and crystallized from a mixture of alcohol-water yielding 3-(6-acetoxy-2-naphthyl)-cyclohexen-2-one-1. Treatment of this product with aluminum isopropoxide in the manner described in Example 13 yielded 3-(6-acetoxy-2-naphthyl) - cyclohexen-2-ol-1. Brief refluxing in the presence of dilute alcoholic alkali yielded 3-(6-hydroxy-2-naphthyl)-cyclohexen-2-ol-1.

*Example 20.—3-(6-hydroxy-5,6,7,8-tetrahydro-2-naphthyl)-cyclohexanol.*— A mixture of 2 grams of 3-(6-hydroxy-2-naphthyl)-cyclohexen-2-one-1, prepared as in Example 15, 300 mg. of nickel catalyst, 20 mg. sodium hydroxide and 50 ml. alcohol was shaken in an autoclave with hydrogen under pressure (2,000 lbs. per sq. inch) at 130° C. for five hours. When cool, the autoclave was opened and the contents washed with alcohol into a beaker. The solution was evaporated to dryness and the residue taken up in 150 ml. of ether. The ethereal solution was washed with water, dilute sodium hydroxide solution, and then water, dried over sodium sulfate, filtered and evaporated to dryness. 3-(6-hydroxy-5,6,7,8-tetrahydro - 2 - naphthyl) -cyclohexanol was obtained as an oily product upon distillation of the residue in high vacuum.

What is claimed is:

1. A 2,6-disubstituted naphthalene compound selected from the class of compounds having the general formulae

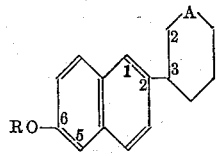

and

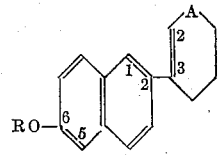

wherein R is selected from the class consisting of hydrogen and a lower alkyl radical; and A is selected from the class consisting of

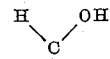

and

radicals.

2. 3-(6-hydroxy-2-naphthyl)-cyclohexanone.
3. 3-(6-methoxy-2-naphthyl)-cyclohexanone.
4. 3-(6-methoxy - 2 - naphthyl)-cyclohexen-2-one-1.
5. 3-(6-hydroxy - 2 - naphthyl)-cyclohexen-2-one-1.
6. 3-(6-hydroxy - 5,6,7,8 - tetrahydro-2-naphthyl)-cyclohexanol.

References Cited in the file of this patent

UNITED STATES PATENTS

| Number | Name | Date |
|---|---|---|
| 2,364,056 | Bruson | Dec. 5, 1944 |

FOREIGN PATENTS

| Number | Country | Date |
|---|---|---|
| 514,592 | Great Britain | Nov. 13, 1939 |

OTHER REFERENCES

Woods et al., Jour. Am. Chem. Soc., vol 73, 1951, pp. 3854–56.